United States Patent [19]

Ono

[11] 4,074,497
[45] Feb. 21, 1978

[54] UNDERWATER TRUSSES FOR BREAKWATER STRUCTURE

[76] Inventor: Taisaburo Ono, 2-2-39, Shinjuka, Zushi, Japan

[21] Appl. No.: 691,612

[22] Filed: June 1, 1976

[51] Int. Cl.² ............................................. E04G 7/20
[52] U.S. Cl. ..................................... 52/648; 52/693; 52/726; 61/3; 403/171
[58] Field of Search ...................... 61/3, 4, 5; 52/223, 52/223 L, 646, 648, 726, 655, 224, 693; 403/171, 173

[56] References Cited

U.S. PATENT DOCUMENTS

| 973,670 | 10/1910 | Kinnear | 52/223 |
|---|---|---|---|
| 998,939 | 7/1911 | Carleton | 52/223 |
| 1,533,019 | 4/1925 | Link et al. | 403/171 |
| 2,527,234 | 10/1950 | Taylor | 52/726 |
| 3,864,049 | 2/1975 | Ono | 61/3 |

FOREIGN PATENT DOCUMENTS 1,117,114  6/1968  United Kingdom .................. 52/230

Primary Examiner—James L. Ridgill, Jr.
Attorney, Agent, or Firm—Gerald J. Ferguson, Jr.; Joseph J. Baker

[57] ABSTRACT

Hollow web members are engaged at the ends thereof with joint members which are provided with holes for holding the end of the web members. The hollow members are provided at an intermediate portion thereof with a flange extending in perpendicular to the members. The truss structure constructed by use of the hollow web members and the joints serves as a breakwater or an underwater structure for protecting an underwater construction from impact of waves.

9 Claims, 6 Drawing Figures

UNDERWATER TRUSSES FOR BREAKWATER STRUCTURE

CROSS-REFERENCES TO RELATED APPLICATION

This application relates to subject matter similar to that disclosed in U.S. Pat. No. 3,864,049 issued to the present inventor.

BACKGROUND OF THE INVENTION

1. Field of the Invention

This invention relates to underwater trusses for breakwater structures, and more particularly to underwater trusses of three-dimensional structure adapted to be used as a breakwater or an underwater structure for protecting an underwater construction from impact of waves.

The underwater trusses in accordance with the present invention is particularly applicable to the construction of large-scale trusses on the bottom of the sea which serves as fishing grounds or an underwater nursery for culturing pearls or marine plants as well as a breakwater.

2. Description of the Prior Art

It has been known in the art to accumulate concrete blocks in the water to break waves. However, the concrete blocks are very difficult to handle and the work to accumulate them on the bottom of the sea needs a great labor. Therefore, it is practically uneconomical to build up a breakwater by use of concrete blocks. Further, the height of the breakwater structure built up by use of the concrete blocks is limited to about 15m.

In order to provide a new underwater construction which is free from the above described defects inherent in the structure made of concrete blocks, it has been known to build up underwater trusses composed of hollow webs and joint members as disclosed in U.S. Pat. No. 3,864,049 patented to the present inventor.

SUMMARY OF THE INVENTION

The object of the present invention is to provide underwater trusses for breakwater structures by use of underwater truss elements the wave braking effect of which is improved from that of the conventional elements as disclosed in said U.S. patent.

Another object of the present invention is to provide underwater trusses for breakwater structures which has improved strength.

Still another object of the present invention is to provide underwater trusses for breakwater structures which has a high effect of creating a turbulent flow.

The above objects are accomplished by providing a disc-shaped flange on the hollow web members of the underwater trusses as disclosed in U.S. Pat. No. 3,864,049. The flange extends perpendicular to the web member and effectively works to creat a turbulent flow when waves come thereagainst.

DESCRIPTION OF THE PREFERRED EMBODIMENTS

Figure 1:
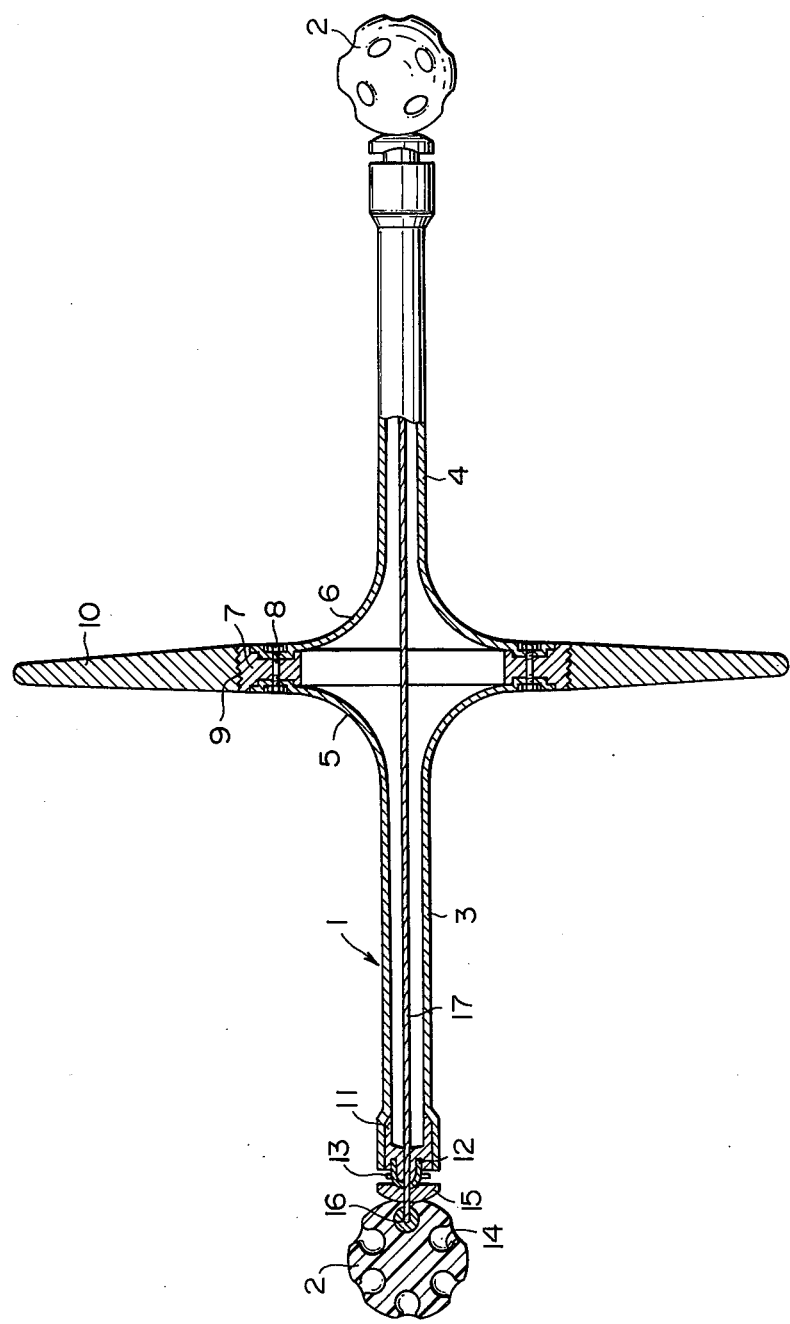
FIG. 1 is a side view partly in longitudinal section of an embodiment a combination of a hollow web member and a pair of joint members engaged at the ends thereof.

Referring to FIG. 1 which depicts a first embodiment of this invention, the structure is shown to comprise a truss web member 1 and joint members 2 joined to web member 1 at opposite ends thereof. The web member 1 is comprised of a pair of connected hollow pipes 3 and 4 made of a rigid material. The hollow pipes 3 and 4 are made of steel, plastic or other rigid material and are long enough to provide sufficient compressive strength. The pipes 3 and 4 are thus capable of withstanding the force of ocean waves. The rigid hollow pipes 3 and 4 are outwardly flared at the ends which connect with each other so as to form flanges 5 and 6. The pipes 3 and 4 are connected to each other via an intervening ring shaped plate 7 by an appropriate number of bolts passing therethrough. As the pipes 3 and 4 are so connected by the flanges 5 and 6 provided thereon, the web member 1 formed thereby is remarkably stronger than it would be if formed of a single hollow pipe. The ring-shaped plate 7 is provided on its outer periphery with threads 9 which engage with a removable disc 10 which serves to further enlarge the diameter of the flanged portion. The disc 10 should preferably be made as large as the forging process admits. However, the disc 10 is not absolutely essential and may be eliminated particularly in structures used under circumstances wherein a large turbulence effect is not required.

A head holder 11 is fitted into and firmly attached to the other end of each of hollow rigid pipes 3 and 4 and an elastic head member 12 engages a deep annular recess in the head holder 11. A holding ring 13 is in tight binding engagement with the outer periphery of the elastic head member 12. The rounded rear portion of the elastic head member 12 is received by a hard plastic cup member 15 which itself is mated with a joint hole 14 of the joint member 2. The hard plastic cup member 15 is provided with an retaining member 16 having a hole at one side through which one end of a tension member 17 passing through hollow pipes 3 and 4 passes to be anchored. The compressive pull of the tension member 17 on the pipes 3 and 4 greatly strengthens these pipes against tensile and bending forces. The tension member 17 may be made of wire cable, polypropylene rope etc. The retaining member 16 is inserted into one of the joint holes 14 provided in joint member 2 to be held firmly therein. Although any number of joint holes may be provided in joint member 2, the maximum number actually used in practical applications is eighteen. The joint hole 14 exerts a sufficiently strong engaging force on retaining member 16 to maintain the connection between member 1 and joint member 2 even when the joint members 2 at opposite ends of the web member 1 are subjected a pulling force which greatly increases the tension of the tension member 17. Although the joint member 2 is preferably made of an elastic material, it can also be made of a rigid material provided that the retaining member 16 on the web member 1 is resilient enough to be easily fitted into the joint hole 14. In order to prevent ready disengagement of the retaining member 16 from the joint 14, the shape of anchor member 16 is best made conical or triangular and not spherical.

Although the retaining member 16 has been described as being compression fitted in the joint hole 14 of the joint member 2, it is also possible to make the joint member 2 hollow and provided a stopper on the retaining member 16 so that the stopper will open inside the hollow joint member 2 thus preventing extraction of the achor member 16. The web member 1 can be easily handled in water with the exertion of very little force if it is made to be buoyed up to an appropriate degree. In the case where the tension member is not a wire cable but rigid body, a material such as foamed urethane can be inserted in the space between the tension member and the inner walls of the hollow pipes 3 and 4 in the process of manufacturing the pipes so as to make the specific gravity of the web member as a whole approximately the same as that of sea water.

Figure 2:
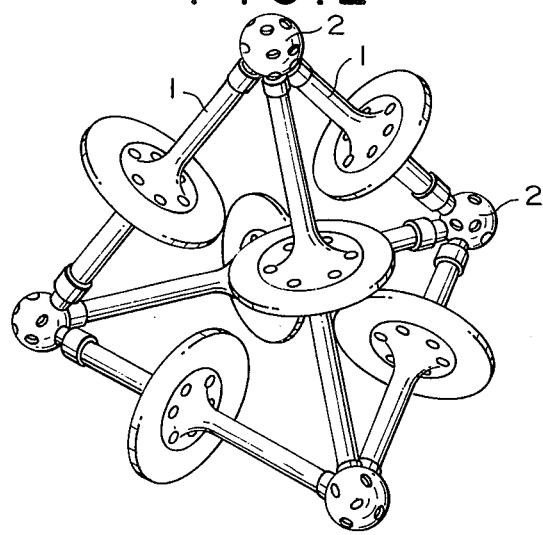
FIG. 2 is a perspective view showing a basic unit of the underwater trusses in accordance with the present invention.

The fundamental unit of the underwater truss constituted of web members 1 and joint members 2 is a tetrahedron which, as shown if FIG. 2, is formed of four web member 1 and four joint members. It is of course necessary to form the plates 7 and the discs 10 in a size so that they do not strike against one another when assembled into the fundamental unit.

Figure 3:
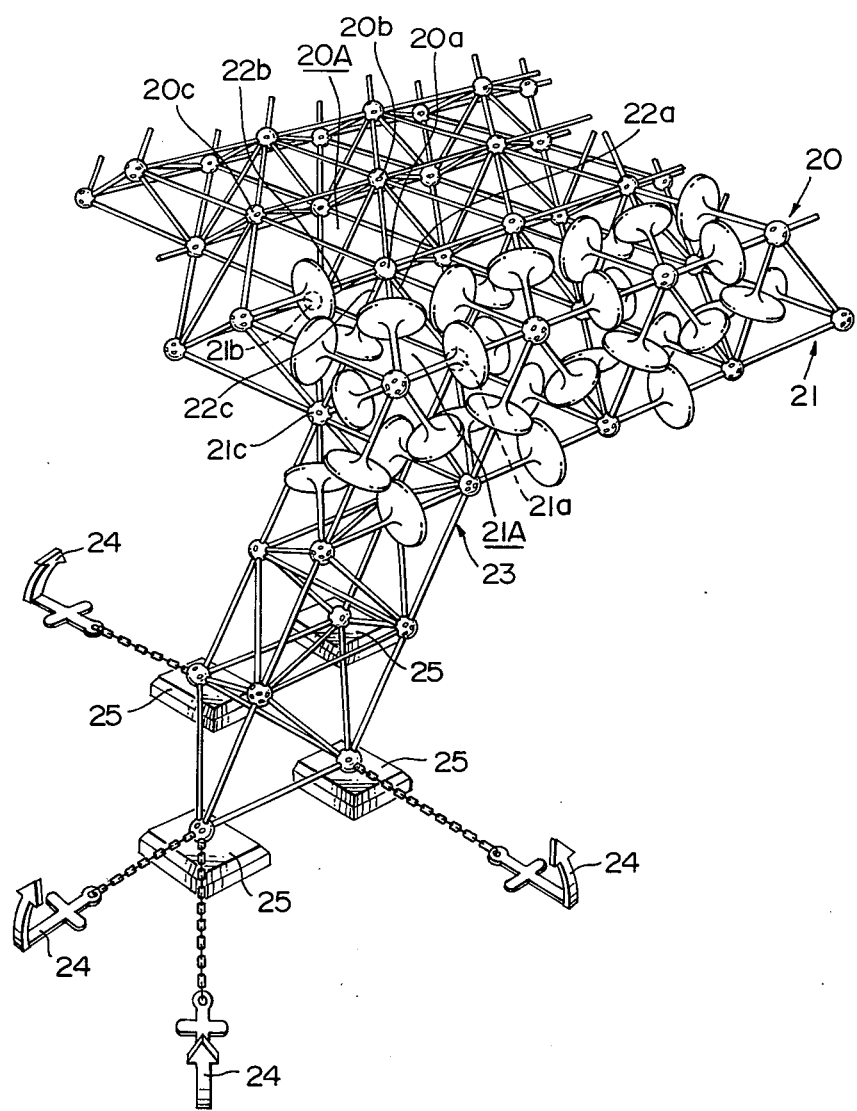
FIG. 3 is a perspective view showing a part of a breakwater built up by use of the underwater trusses in accordance with the present invention.

Fundamental units of the type shown in FIG. 2 are further assemble into a truss structure such as that shown in FIG. 3. The truss structure is a combination of tetrahedral units in which a pair of two-dimensional truss structures 20 and 21 extending in parallel are combined by means of binding webs 22a, 22b . . . to form the regular tetrahedral units shown in FIG. 3. For example, webs 22a, 22b and 22c extending from a vertex 20a of a triangle 20a in the upper two-dimensional truss structure 51 diagonally downward to three vertices 21a, 21b and 21c of a triangle of the lower truss structure 52 form a regular tetrahedron. The three vertices 20a, 20b and 20c and said vertex 21b form another tetrahedron.

At the corner of the lower truss structure 21 is formed a leg portion 23 made of a downwardly extending truss structure. The lower end of the leg portion 23 is secured to concrete blocks or the like 25 which are anchored to the bottom of the sea by means of anchors 24.

Figure 4:
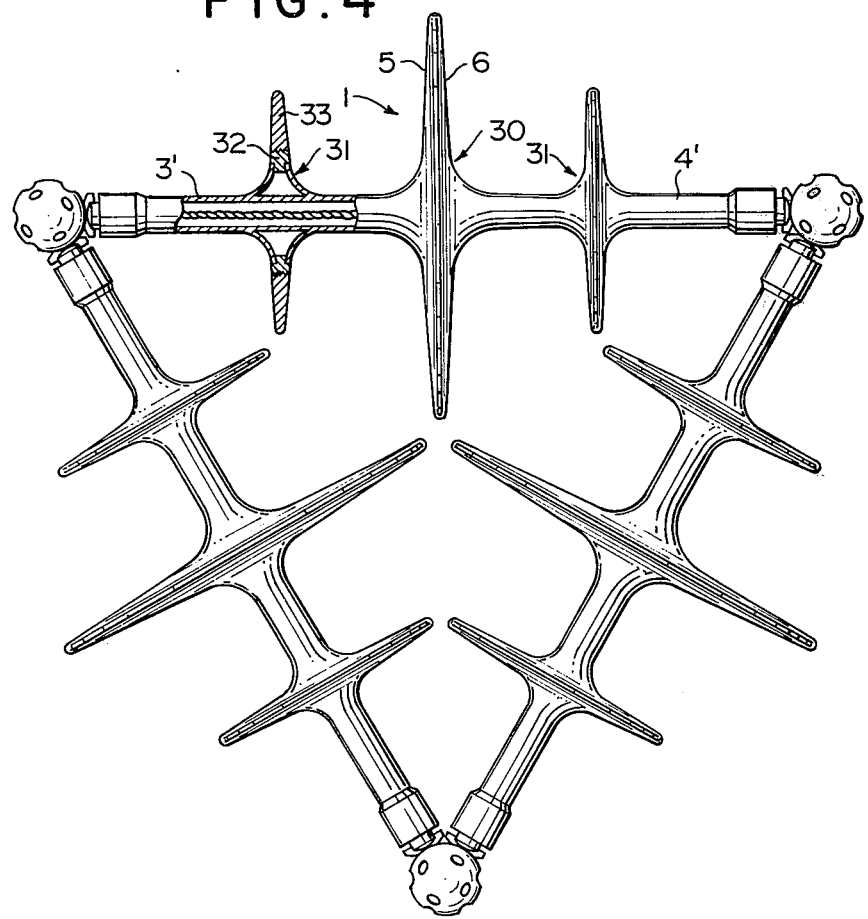
FIG. 4 is a plan view showing another embodiment of a combination of hollow web members and joint members assembled together to form a basic triangular unit of trusses in accordance with the present invention.

FIG. 4 is a plan view of the two-dimensional fundamental unit of a truss structure in accordance with a second embodiment of this invention. In this embodiment two auxiliary flange members 31 are provided on the web member 1, one on either side of the major flange member 30 formed of flanges 5 and 6. The auxiliary flange members 31 are formed separately of rigid pipes 3' and 4' and are attached to the middle portion thereof by welding. The auxiliary flange members 31 are similar to the major flange member 3 in that each comprises a ring-shaped plate 32 and a disc 33 but they are made to have a smaller diameter than the major flange member. The auxiliary flange members 31 may also be made integrally with the hollow rigid pipe in the same manner as the main flange member 30. Or inversely, the main flange member 30 can be made separate of the pipe in the manner first described in connection with the auxiliary flange members.

Figure 5:
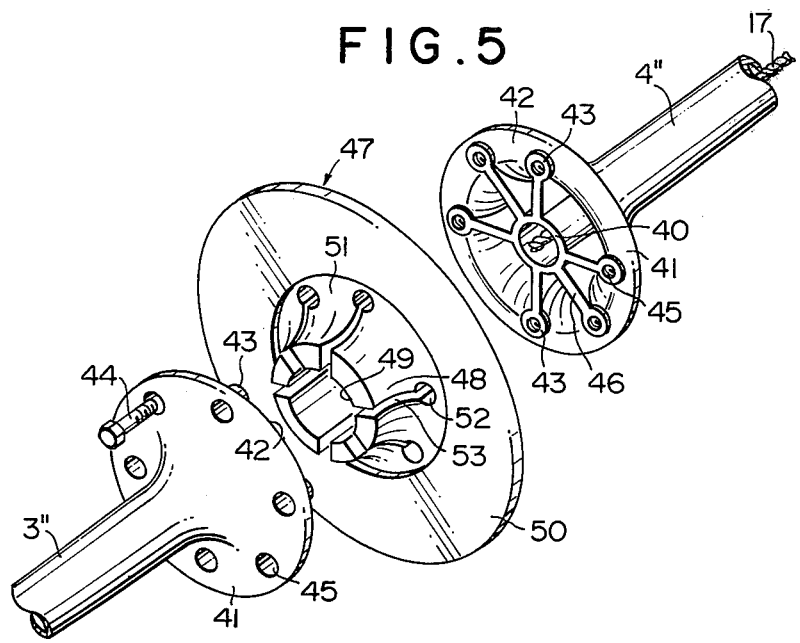
FIG. 5 is an exploded perspective view showing a still another embodiment of the truss element in accordance with the present invention.
Figure 6:
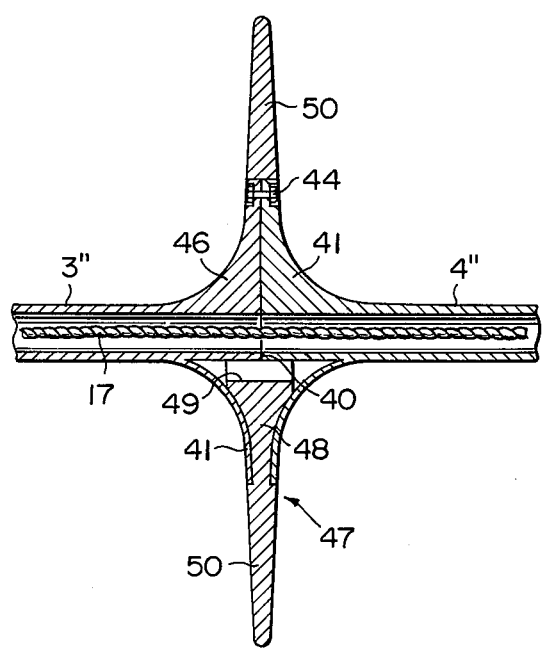
FIG. 6 is a fragmentary longitudinal sectional view of the element as shown in FIG. 5.

FIGS. 5 and 6 show a third embodiment of the present invention wherein a flared flange 41 is provided on and integrally with the end 40 of each of two rigid hollow pipes 3" and 4". The flange 41 is formed to have its outside face 42 in the same plane as the end 40 of the pipe on which it is provided. The flange 41 is provided with a plurality of raised portions 43 each having a bolt hole 45 for the passage of a bolt 44. Between each raised portion 43 on the flange provided on the pipe 4" and the end 40 of the pipe 4 and in the same plane as these is provided a rib 46. The ribs 46 serve to reinforce the flange 41.

Plate 47' destined to be interposed between rigid hollow pipes 3" and 4" has an axially projecting retaining portion 48 at its center. The retaining portion 48 is provided with a through hole 49 for receiving the ends 40 of the rigid hollow pipes 3" and 4". Between the retaining portion 48 and an outwardly tapering disc 50 is provided an annular recess 51 at the position destined to mate with outer edge 42 of the peripheral portion of flange 41. The recess 51 is provided with a plurality of holes 52 into which the raised portions 43 are inserted. Each hole 52 connects with a slot 53 provided in the retaining portion 48. The slots 53 receive the ribs 46 extending radially on the outside face of flange 41.

In this embodiment, the ends 40 of the pipes 3" and 4" pass into the through hole 49, the ribs 46 into the slots 53 and raised portions into the holes 52. As can be seen from FIG. 6, the ends 40, the ribs 46 and the raised portions 43 of each of the rigid hollow pipes come into abutting contact with those of the other to greatly increase the strength of the web member 1.

I claim:

1. Construction elements of underwater trusses for a breakwater structure comprising first and second co-linearly disposed, hollow web members having at opposite ends thereof engaging means and at adjacent ends thereof flanges extending perpendicular thereto, an annular plate disposed between said flanges, means for connecting said flanges and said annular plate together and hollow joint members engaged at the opposite ends of said hollow web members with said engaging means, a tension member extending through said hollow web members and having ends extending into the hollow portions of said hollow joint members and fixedly connected therein.

2. Underwater trusses for breakwater structure as defined in claim 1 wherein said flange is disc-shaped.

3. Underwater trusses for breakwater structure as defined in claim 1 wherein a plurality of flanges are fixed to the hollow web members, said flanges being extending in parallel to each other.

4. Underwater trusses for breakwater structure as defined in claim 1 wherein said flange is integrally fixed to the hollow web members.

5. Underwater trusses for breakwater structure as defined in claim 1 wherein said flange is removably mounted to the hollow web members.

6. Construction elements as in claim 1 including an annular disc removably secured to the outer periphery of said annular plate.

7. Construction elements as in claim 1 including means for connecting said flanges to said annular plate.

8. Construction elements as in claim 1 where said annular plate has a plurality of openings extending therethrough, said construction elements including means for connecting said flanges to one another through said openings.

9. Construction elements as in claim 1 where said hollow joint members are spherical.

* * * * *